(12) United States Patent
Sharma et al.

(10) Patent No.: US 11,398,896 B2
(45) Date of Patent: Jul. 26, 2022

(54) BUILDING DEVICE WITH BLOCKCHAIN BASED VERIFICATION OF BUILDING DEVICE FILES

(71) Applicant: Johnson Controls Technology Company, Auburn Hills, MI (US)

(72) Inventors: Nidhi Sharma, Pune (IN); Sreekesh Sreelal, Pune (IN); Sumit K. Jha, Pune (IN); Pushpendra Singh Kharsan, Pune (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 396 days.

(21) Appl. No.: 16/724,035

(22) Filed: Dec. 20, 2019

(65) Prior Publication Data

US 2020/0243205 A1 Jul. 30, 2020

(51) Int. Cl.
| | |
|---|---|
| *H04L 29/06* | (2006.01) |
| *H04L 9/06* | (2006.01) |
| *G16Y 40/35* | (2020.01) |
| *H04L 9/32* | (2006.01) |
| *G06F 16/13* | (2019.01) |

(Continued)

(52) U.S. Cl.
CPC ........ *H04L 9/0637* (2013.01); *G06F 16/137* (2019.01); *G06F 16/1837* (2019.01); *G06F 21/64* (2013.01); *G16Y 40/35* (2020.01); *H04L 9/3263* (2013.01); *H04L 2209/38* (2013.01)

(58) Field of Classification Search
None
See application file for complete search history.

(56) References Cited

U.S. PATENT DOCUMENTS

| | | |
|---|---|---|
| 9,858,781 B1 | 1/2018 | Campero et al. |
| 10,187,471 B2 | 1/2019 | Alberth, Jr. |

(Continued)

FOREIGN PATENT DOCUMENTS

| | | |
|---|---|---|
| WO | WO-2018/048640 | 3/2018 |
| WO | WO-2018/048651 | 3/2018 |

(Continued)

OTHER PUBLICATIONS

BigchainDB 2.0 The Blockchain Database, dated May 2018, Paper version 101, BigchainDB GmbH, Berlin, Germany, 14 pages.

(Continued)

*Primary Examiner* — Andrew J Steinle
(74) *Attorney, Agent, or Firm* — Foley & Lardner LLP

(57) ABSTRACT

A building device of a building includes or is in communication with a processing circuit configured to store one or more files, each of the one or more files comprising instructions and a ledger, the ledger comprising information describing at least one of the one or more files. The processing circuit is configured to verify the one or more files by retrieving a root ledger from storage of the processing circuit, wherein the root ledger comprises information based on one or more characteristics of a blockchain, reassembling the blockchain based on the ledger of each of the one or more files, verifying the blockchain with the root ledger, and verifying the one or more files with the verified blockchain. The processing circuit is configured to execute the instructions of the one or more files in response to a determination that the one or more files are verified.

20 Claims, 8 Drawing Sheets

(51) Int. Cl.
*G06F 16/182* (2019.01)
*G06F 21/64* (2013.01)

(56) References Cited

U.S. PATENT DOCUMENTS

| | | | |
|---|---|---|---|
| 10,262,140 B2* | 4/2019 | Smith | H04L 9/3234 |
| 10,417,451 B2 | 9/2019 | Park et al. | |
| 2017/0338967 A1* | 11/2017 | Lewison | H04L 9/3268 |
| 2018/0075247 A1 | 3/2018 | Campero et al. | |
| 2018/0075677 A1 | 3/2018 | Campero et al. | |
| 2018/0075686 A1 | 3/2018 | Campero et al. | |
| 2018/0076962 A1 | 3/2018 | Campero et al. | |
| 2018/0077151 A1 | 3/2018 | Campero et al. | |
| 2018/0082296 A1* | 3/2018 | Brashers | H04L 63/0428 |
| 2018/0089971 A1 | 3/2018 | Campero et al. | |
| 2018/0328612 A1 | 11/2018 | Sinha et al. | |
| 2019/0095835 A1 | 3/2019 | Jarvis et al. | |
| 2019/0188941 A1 | 6/2019 | Campero et al. | |

FOREIGN PATENT DOCUMENTS

| | | |
|---|---|---|
| WO | WO-2018/048662 | 3/2018 |
| WO | WO-2018/048663 | 3/2018 |
| WO | WO-2018/048691 | 3/2018 |
| WO | WO-2018/048692 | 3/2018 |

OTHER PUBLICATIONS

Key concepts of BigchainDB, 2019 BigchainDB GmbH, 10 pages.
Meet BigchainDB. The blockchain database, 2019 BigchainDB GmbH, 7 pages.
Tutorial: How to create a digital record of a piece of art, 2019 BigchainDB GmbH, 10 pages.
Tutorial: How to create a digital twin of your car, 2019 BigchainDB GmbH, 12 pages.
Tutorial: How to launch your own token on BigchainDB, 2019 BigchainDB GmbH, 10 pages.
Tutorial: Role-based access control in BigchainDB, 2019 BigchainDB GmbH, 8 pages.
OP-TEE Documentation. Linaro. Nov. 25, 2019. 163 pages.
OP-TEE Overview. 2019, STMicroelectronics. Web. https://wiki.st.com/stm32mpu/wiki/OP-TEE_overview, 1 page.
Bech, Joakim, OP-TEE, open-source security for the mass-market, Sep. 3, 2014. Web. https://www.linaro.org/blog/op-tee-open-source-security-mass-market/, 9 pages.
OP-TEE_CLIENT. 2019. Linaro Revision 6b67a66c. Web. https://optee.readthedocs.io/en/latest/buliding/gits/optee_client.html, 1 page.

* cited by examiner

BUILDING DEVICE WITH BLOCKCHAIN BASED VERIFICATION OF BUILDING DEVICE FILES

CROSS-REFERENCE TO RELATED PATENT APPLICATION

This application claims the benefit of and priority to Indian Provisional Patent Application No. 201921001358 filed Jan. 11, 2019, the entirety of which is incorporated by reference herein.

BACKGROUND

The present disclosure relates generally to building devices of building systems that operate a building. The present disclosure relates more particularly to security for the building devices of the building systems.

Internet of Things (IoT) devices, e.g., building IoT devices, are at high risk of being compromised via their connection to the Internet which enables remote access to, or operation of, the building IoT devices. A building IoT device being compromised may allow a user or system to change binary files (e.g., executable programs and libraries) of the building IoT device in order to manipulate the operation of the building IoT devices and/or gain access to, and/or manipulate, user data. If a building IoT device is compromised, an outside user or system may only become aware of the building IoT device being compromised after observing a change in user data and/or behavior of the building IoT device. It would be beneficial to be able to identify whether a building IoT device has been compromised before direct observation. In some cases, there may not be a measure to check the authenticity and integrity of the binary files present on a storage device of the IoT device at runtime (e.g., before the binary files are executed) but rather, observation of the behavior of the IoT device while running may be used to identify whether the IoT device has been compromised.

In some cases, validation and authentication of binary files depends on certificates and/or certificate chain validation. However, such validation techniques make the building IoT device open to attacks such as certificate forging, hash collision attacks, and brute force key attacks. With such techniques, all the binary files are signed by a certificate authority (CA) or chain of CAs, compromising any of the CAs in the chain leads to compromising the authenticity of the signed binary file. Thus, certificates are a trust-based model and a single-point of failure.

SUMMARY

One implementation of the present disclosure is a building device of a building, the building device including or being in communication with a processing circuit configured to store one or more files, each of the one or more files including instructions and a ledger, the ledger including information describing at least one of the one or more files. The processing circuit is configured to verify the one or more files by retrieving a root ledger from storage of the processing circuit, wherein the root ledger includes second information based on one or more characteristics of a blockchain, reassembling the blockchain based on the ledger of each of the one or more files, verifying the blockchain with the root ledger, and verifying the one or more files with the blockchain verified with the root ledger. The processing circuit is configured to execute the instructions of the one or more files in response to a determination that the one or more files are verified.

In some embodiments, verifying the one or more files with the blockchain verified with the root ledger includes determining at least one of a size or a hash of each of the one or more files and comparing at least one of the size or the hash of each of the one or more files to a stored size and a stored hash stored within the blockchain verified with the root ledger to verify the one or more files.

In some embodiments, the processing circuit is configured to verify the one or more files by retrieving a build key from the storage of the processing circuit and verifying the blockchain with the build key.

In some embodiments, the second information based on the one or more characteristics of the blockchain include a stored checksum, wherein the stored checksum is based on a block hash of each of blocks of the blockchain and a device key, wherein the root ledger further includes the device key.

In some embodiments, verifying the blockchain with the root ledger includes generating a checksum based the block hash of each of the blocks of the blockchain and the device key and comparing the checksum to the stored checksum.

In some embodiments, the one or more files are one or more binary files including binary data representing the instructions and metadata, wherein the metadata includes the ledger.

In some embodiments, the processing circuit is configured to receive a request to execute the instructions of at least one of the one or more files and verify the one or more files in response to a reception of the request to execute the instructions of the one or more files.

In some embodiments, the processing circuit is configured to determine, via a timer, that an amount of time has elapsed and verify the one or more files in response to a second determination that the amount of time has elapsed.

In some embodiments, the processing circuit is configured to determine the amount of time by pseudo-randomly generating a value for the amount of time.

In some embodiments, the processing circuit is a trusted chipset configured to implement a trusted operating system and a non-trusted operating system.

In some embodiments, the storage is secured storage of the trusted operating system and is only accessible by the trusted operating system.

In some embodiments, the trusted chipset is configured to verify, via the trusted operating system, the blockchain with a build key and the root ledger. In some embodiments, the trusted chipset is configured to execute, via the non-trusted operating system, the instructions of the one or more files in response to the determination that the one or more files are verified.

In some embodiments, the blockchain including blocks, each of the blocks including a signature, wherein the processing circuit is configured to verify the one or more files with a build key by verifying the signature of each of the blocks of the blockchain with the build key.

In some embodiments, each of the blocks corresponds to one of the one or more files, wherein the one or more files are files. In some embodiments, a first block of the blocks corresponds to a first file and a second block of the blocks corresponds to a second file.

In some embodiments, the second block includes particular information of the second file, a hash of the first block, and a particular signature.

In some embodiments, the particular information of the second file includes at least one of a path of the second file indicating a location where the second file is stored, a size of the second file, or a second hash of the second file.

In some embodiments, the particular signature is based on a private build key and the particular information of the second file, wherein the build key is a public build key linked with the private build key. In some embodiments, the processing circuit is configured to verify the blockchain with the public build key by determining that the particular signature is authentic based on the particular information of the second file, the signature, and the public build key.

Another implementation of the present disclosure is a method including storing, by a processing circuit associated with a building device, one or more files in first storage of the processing circuit, each of the one or more files including instructions and a ledger, the ledger including information describing at least one of the one or more files. The method includes verifying, by the processing circuit, the one or more files by retrieving a root ledger from second storage of the processing circuit, wherein the root ledger includes second information based on one or more characteristics of a blockchain, reassembling the blockchain based on the ledger of each of the one or more files, verifying the blockchain with the root ledger, and verifying the one or more files with the blockchain verified with the root ledger. The method includes executing, by the processing circuit, the instructions of the one or more files in response to a determination that the one or more files are verified.

In some embodiments, the processing circuit is a trusted chipset configured to implement a trusted operating system and a non-trusted operating system. In some embodiments, the second storage is secured storage of the trusted operating system and is only accessible by the trusted operating system.

In some embodiments, verifying the blockchain with the root ledger includes verifying, via the trusted operating system, the blockchain with a build key and the root ledger. In some embodiments, executing, by the processing circuit, the instructions includes executing the one or more files via the non-trusted operating system.

Another implementation of the present disclosure is an edge device including a processing circuit configured to store one or more files, each of the one or more files including instructions and a ledger, the ledger including information describing at least one of the one or more files. The processing circuit is configured to verify the one or more files by retrieving a root ledger from storage of the processing circuit, wherein the root ledger includes second information based on one or more characteristics of a blockchain, reassembling the blockchain based on the ledger of at least one of the one or more files, verifying the blockchain with the root ledger, and verifying the one or more files with the blockchain verified with the root ledger. The processing circuit is configured to execute the instructions of the one or more files in response to a determination that the one or more files are verified.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
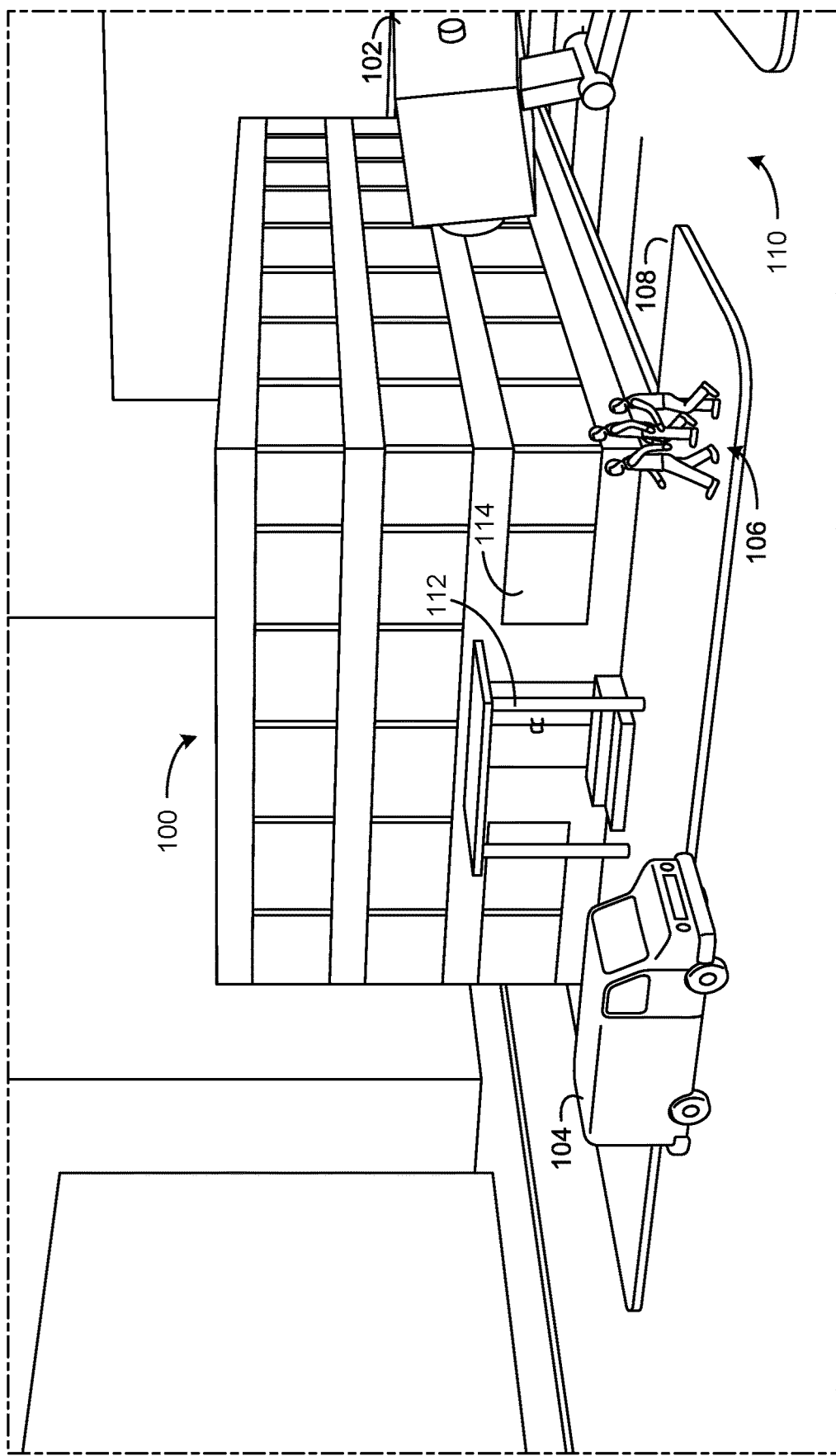
FIG. 1 is a perspective view schematic drawing of a building with building systems, according to an exemplary embodiment.

Referring generally to the FIGURES, systems and methods of a building device for blockchain based verification of building device files are shown, according to various exemplary embodiments. For many building devices, it is important to allow only binary files authenticated by the manufacturer to execute on the building device. By allowing unauthenticated and/or tampered binary files to run on the building device, there is a risk of a hacker executing malware on the building device or other unwanted code which can lead to security breach of the building device or a larger system. Tampered binary files are a source of information of a data breach. It is important to detect the tampering as soon as possible to prevent further spread of malware or alternatively so that the targeted binary can be used as a honeypot for investigation of the malware.

The building device as described herein utilizes blockchain and reaching a consensus to solve the problem of booting a safe payload (e.g., a binary file). The building device is configured to verify binary files at runtime (e.g., user space applications, which are executed much later after startup and loading of operating system). The blockchain verification mechanism as discussed herein can detect tampering of binaries after the device has started up and running.

The building device as described herein is configured to authenticate binary files with blockchain before execution of the binary files. This provides a mechanism for the building device to detect tampering of binary files during the lifetime of the device. The building device can include a processing circuit utilizing a trusted chipset. For example, the trusted chipset can be configured to implement multiple operating systems, e.g., a trusted operating system for performing trusted operations and a non-trusted operating system for performing normal execution of operations, e.g., execution of the binary files. The building device can be configured to execute multiple different binary files. However, each binary file can include a blockchain ledger that can be stored via the non-trusted operating system. A root ledger for the blockchain can be stored in secured storage by the trusted operating system. The root ledger can include information such as a device key, a checksum of the blockchain, and metadata. Together, the root ledger and the blockchain ledgers can be used to verify the binary files 308.

The blockchain ledgers stored by the building device may be based on, and/or may include, data of the binary files (e.g., size of the binary files, hash of the binary files, file location of the binary files, etc.). The building device can be configured to reassemble the blockchain with the blockchain ledgers of the binary files and/or the root ledger and validate the digital signatures of each block of the reassembled blockchain with a public build key where the public build key is associated with a private build key used to sign each block of the blockchain (the private build key is used to generate a digital signature by signing the block data with the private build key, the public build key and the block data can be used to authenticate the digital signature).

In response to a determination that the blocks are validly signed, the building device can be configured to verify that the size and/or hash of a binary file to be executed matches the size and/or hash of one block of a reassembled blockchain that is associated with the binary file to be executed. Each block of the blockchain may include a file location and/or other file identifier. In this regard, the building device can identify what file size and/or hash are required to be compared to the actual file size and/or hash by identifying the block with the location data of the binary file. Furthermore, the reassembled blockchain can be verified with a checksum of the root ledger. The checksum may be a checksum based on a device key of the building device and the hash of each block of the blockchain. In this regard, the building device can compute a checksum for a reassembled blockchain and compare the computed checksum against the stored checksum of the root ledger to verify that the checksums match, proving that the binary files are valid.

With the blockchain based verification of binary files, the building device may not be required to rely on third party CAs and therefore the production and/or maintenance costs of the building device can be reduced. Furthermore, the building device discussed herein provides an efficient and immediate identification of the building device being compromised. In many cases, when a building device is compromised, a user or authority does not know that the device is compromised until the behavior of the device is observed to be abnormal. However, since the building device as described herein is configured to verify the integrity of all the binary files before and/or during execution, the building device can immediately identify if any binary file has been compromised allowing the building device to immediately be managed (e.g., quarantined) to suppress a larger attack. For example, if a building device is compromised with malware, ransomware, and/or any other virus, the building device may spread the malicious code. In some embodiments, the verification of the binary files can be performed frequently at intervals, e.g., at pseudo-randomly determined time periods to prevent the verification time being predictable by a hacker. However, since the building device as described herein can immediately (or before execution of the infected code) identify the malicious code, the risk of the spread of a virus to other building devices can be reduced.

Building with Building Systems

Referring now to FIG. 1, a building 100 with a security camera 102 and a parking lot 110 is shown, according to an exemplary embodiment. The building 100 is a multi-story commercial building surrounded by or near the parking lot 110 but can be any type of building in some embodiments. The building 100 can be a school, a hospital, a store, a place of business, a residence, an apartment complex, a hotel, an office building, etc. The building 100 may be associated with the parking lot 110.

Both the building 100 and the parking lot 110 are at least partially in the field of view of the security camera 102. In some embodiments, multiple security cameras 102 may be used to capture the entire building 100 and parking lot 110 not in (or in to create multiple angles of overlapping or the same field of view) the field of view of a single security camera 102. The parking lot 110 can be used by one or more vehicles 104 where the vehicles 104 can be either stationary or moving (e.g. delivery vehicles). The building 100 and parking lot 110 can be further used by one or more pedestrians 106 who can traverse the parking lot 110 and/or enter and/or exit the building 100. The building 100 may be further surrounded or partially surrounded by a sidewalk 108 to facilitate the foot traffic of one or more pedestrians 106, facilitate deliveries, etc. In other embodiments, the building 100 may be one of many buildings belonging to a single industrial park, shopping mall, or commercial park having a common parking lot and security camera 102. In another embodiment, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. In some embodiments, the doors are secured through biometric information, e.g., facial recognition, fingerprint scanners, etc. The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

The building 100 can further include HVAC systems. For example, waterside systems, airside systems, building management systems, and/or various other HVAC systems can be included within the building 100. For example, equipment such as chillers, boilers, rooftop units, air handler units, thermostats, sensors, actuators, dampers, valves, and other equipment can be implemented within the building 100 to control the environmental conditions of the building 100. Examples of building equipment that can be implemented within the building 100 can be found in U.S. patent application Ser. No. 16/048,052 filed Jul. 27, 2018, the entirety of which is incorporated by reference herein.

Figure 2:
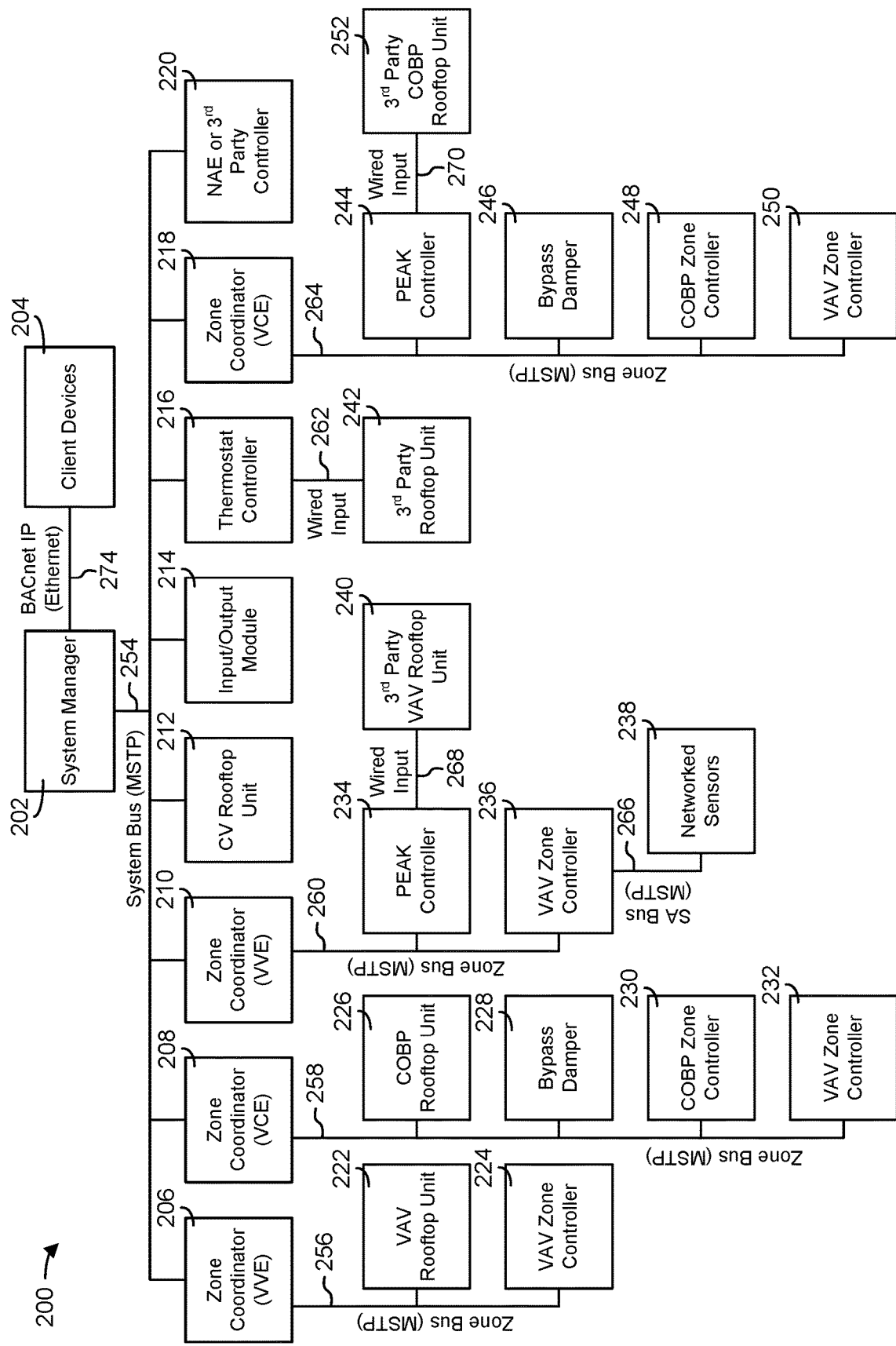
FIG. 2 is a block diagram of a BMS which can be used to monitor and control the building of FIG. 1, according to some embodiments.

Referring now to FIG. 2, a block diagram of a building management system (BMS) 200 is shown, according to some embodiments. BMS 200 can be used to monitor and control the devices of an HVAC system, a waterside system, an airside system, building subsystems, as well as other types of BMS devices (e.g., lighting equipment, security equipment, etc.) and/or HVAC equipment.

BMS 200 provides a system architecture that facilitates automatic equipment discovery and equipment model distribution. Equipment discovery can occur on multiple levels of BMS 200 across multiple different communications busses (e.g., a system bus 254, zone buses 256-260 and 264, sensor/actuator bus 266, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 200 can begin interacting with the new device (e.g., sending control signals, using data from the device) without user interaction.

Some devices in BMS 200 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 200 store their own equipment models. Other devices in BMS 200 have equipment models stored externally (e.g., within other devices). For example, a zone coordinator 208 can store the equipment model for a bypass damper 228. In some embodiments, zone coordinator 208 automatically creates the equipment model for bypass damper 228 or other devices on zone bus 258. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 2, BMS 200 is shown to include a system manager 202; several zone coordinators 206, 208, 210 and 218; and several zone controllers 224, 230, 232, 236, 248, and 250. System manager 202 can monitor data points in BMS 200 and report monitored variables to various monitoring and/or control applications. System manager 202 can communicate with client devices 204 (e.g., user devices, desktop computers, laptop computers, mobile devices, etc.) via a data communications link 274 (e.g., BACnet IP, Ethernet, wired or wireless communications, etc.). System manager 202 can provide a user interface to client devices 204 via data communications link 274. The user interface may allow users to monitor and/or control BMS 200 via client devices 204.

In some embodiments, system manager 202 is connected with zone coordinators 206-210 and 218 via a system bus 254. System manager 202 can be configured to communicate with zone coordinators 206-210 and 218 via system bus 254 using a master-slave token passing (MSTP) protocol or any other communications protocol. System bus 254 can also connect system manager 202 with other devices such as a constant volume (CV) rooftop unit (RTU) 212, an input/output module (IOM) 214, a thermostat controller 216 (e.g., a TEC2000 series thermostat controller), and a network automation engine (NAE) or third-party controller 220. RTU 212 can be configured to communicate directly with system manager 202 and can be connected directly to system bus 254. Other RTUs can communicate with system manager 202 via an intermediate device. For example, a wired input 262 can connect a third-party RTU 242 to thermostat controller 216, which connects to system bus 254.

System manager 202 can provide a user interface for any device containing an equipment model. Devices such as zone coordinators 206-210 and 218 and thermostat controller 216 can provide their equipment models to system manager 202 via system bus 254. In some embodiments, system manager 202 automatically creates equipment models for connected devices that do not contain an equipment model (e.g., IOM 214, third party controller 220, etc.). For example, system manager 202 can create an equipment model for any device that responds to a device tree request. The equipment models created by system manager 202 can be stored within system manager 202. System manager 202 can then provide a user interface for devices that do not contain their own equipment models using the equipment models created by system manager 202. In some embodiments, system manager 202 stores a view definition for each type of equipment connected via system bus 254 and uses the stored view definition to generate a user interface for the equipment.

Each zone coordinator 206-210 and 218 can be connected with one or more of zone controllers 224, 230-232, 236, and 248-250 via zone buses 256, 258, 260, and 264. Zone coordinators 206-210 and 218 can communicate with zone controllers 224, 230-232, 236, and 248-250 via zone busses 256-260 and 264 using a MSTP protocol or any other communications protocol. Zone busses 256-260 and 264 can also connect zone coordinators 206-210 and 218 with other types of devices such as variable air volume (VAV) RTUs 222 and 240, changeover bypass (COBP) RTUs 226 and 252, bypass dampers 228 and 246, and PEAK controllers 234 and 244.

Zone coordinators 206-210 and 218 can be configured to monitor and command various zoning systems. In some embodiments, each zone coordinator 206-210 and 218 monitors and commands a separate zoning system and is connected to the zoning system via a separate zone bus. For example, zone coordinator 206 can be connected to VAV RTU 222 and zone controller 224 via zone bus 256. Zone coordinator 208 can be connected to COBP RTU 226, bypass damper 228, COBP zone controller 230, and VAV zone controller 232 via zone bus 258. Zone coordinator 210 can be connected to PEAK controller 234 and VAV zone controller 236 via zone bus 260. Zone coordinator 218 can be connected to PEAK controller 244, bypass damper 246, COBP zone controller 248, and VAV zone controller 250 via zone bus 264.

A single model of zone coordinator 206-210 and 218 can be configured to handle multiple different types of zoning systems (e.g., a VAV zoning system, a COBP zoning system, etc.). Each zoning system can include a RTU, one or more zone controllers, and/or a bypass damper. For example, zone coordinators 206 and 210 are shown as Verasys VAV engines (VVEs) connected to VAV RTUs 222 and 240, respectively. Zone coordinator 206 is connected directly to VAV RTU 222 via zone bus 256, whereas zone coordinator 210 is connected to a third-party VAV RTU 240 via a wired input 268 provided to PEAK controller 234. Zone coordinators 208 and 218 are shown as Verasys COBP engines (VCEs) connected to COBP RTUs 226 and 252, respectively. Zone coordinator 208 is connected directly to COBP RTU 226 via zone bus 258, whereas zone coordinator 218 is connected to a third-party COBP RTU 252 via a wired input 270 provided to PEAK controller 244.

Zone controllers 224, 230-232, 236, and 248-250 can communicate with individual BMS devices (e.g., sensors, actuators, etc.) via sensor/actuator (SA) busses. For example, VAV zone controller 236 is shown connected to networked sensors 238 via SA bus 266. Zone controller 236 can communicate with networked sensors 238 using a MSTP protocol or any other communications protocol. Although only one SA bus 266 is shown in FIG. 2, it should be understood that each zone controller 224, 230-232, 236, and 248-250 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 224, 230-232, 236, and 248-250 can be configured to monitor and control a different building zone. Zone controllers 224, 230-232, 236, and 248-250 can use the inputs and outputs provided via their SA busses to monitor and control various building zones. For example, a zone controller 236 can use a temperature input received from networked sensors 238 via SA bus 266 (e.g., a measured temperature of a building zone) as feedback in a temperature control algorithm. Zone controllers 224, 230-232, 236, and 248-250 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Blockchain Based Verification

Figure 3:
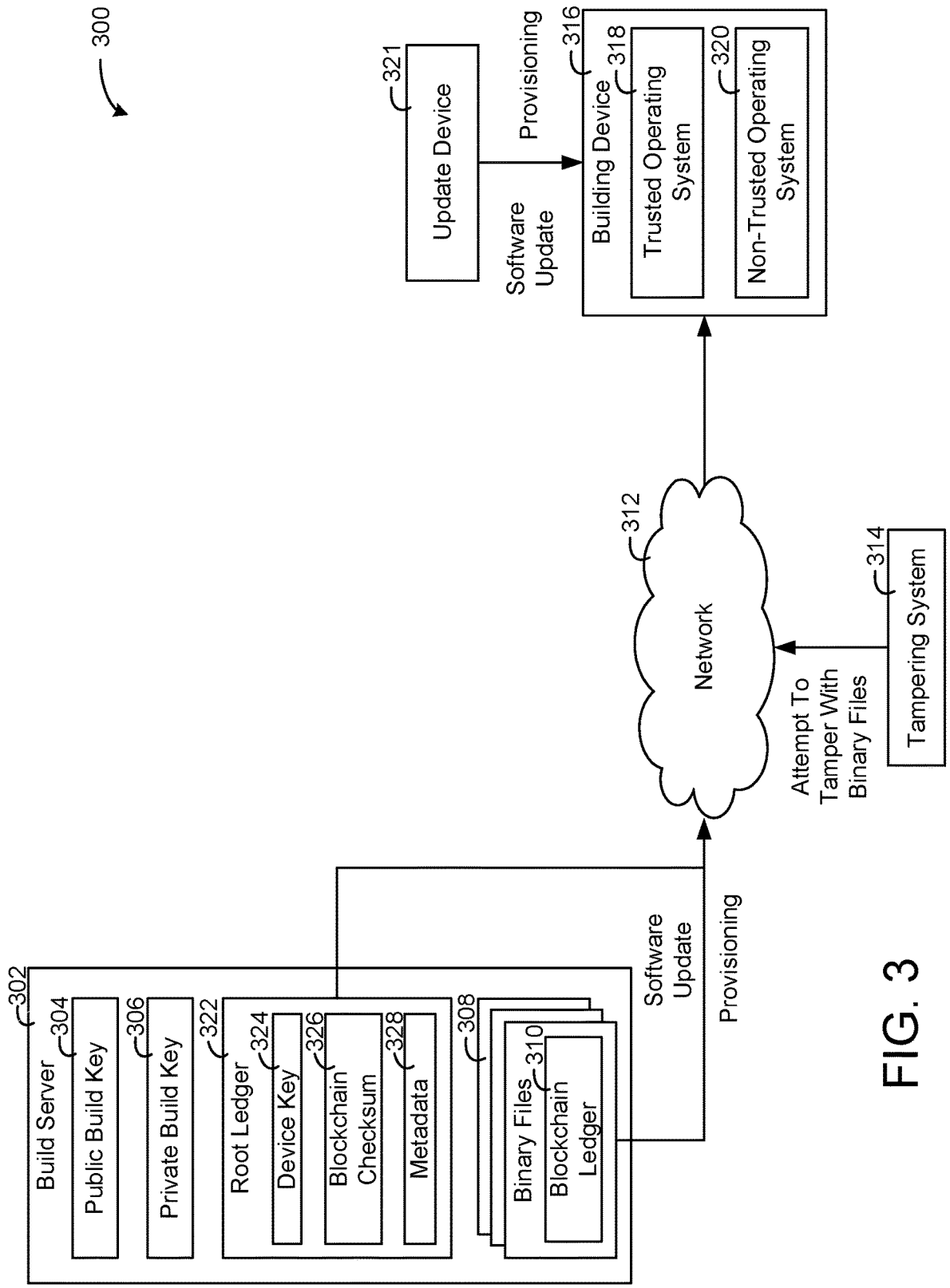
FIG. 3 is a block diagram of a system including a building device with a trusted operating system and a non-trusted operating system configured to execute binary files generated by a build server, according to an exemplary embodiment.

Referring now to FIG. 3, a system 300 including a building device 316 and a build server 302 for implementing blockchain based verification of binary files executed by the building device 316 is shown, according to an exemplary embodiment. Binary authentication sometimes relies on certificates and CAs for authentication. This method is very centralized to CAs and there are already known attacks on the same. In some cases, the authentication happens only once by the loader. The blockchain based verification of the system 300 addresses this issue by decentralizing authentication of binaries using blockchain, validating binary files at random intervals or based on events, and/or using multiple binaries which serve as root of trust for authenticating and validating each other. The blockchain based verification of the system 300 removes the requirement for CAs.

The build server 302 can be a server system configured to perform processing operations and/or communicate, via the network 312, with the various devices and systems of the network 312. The build server 302 can be a server including processors and/or memories. In some embodiments, the build server 302 is a cloud-based system, e.g., MICROSOFT AZURE®, AMAZON WEB SERVICES (AWS)®, etc. The building device 316 can be a building device for a building security system, a building HVAC system, a building access control system, a building surveillance system, and/or any other building system. The building device 316 can be the same as and/or similar to any system, device, and/or controller as described with FIGS. 1-2 including but not limited to the security camera 102, the client devices 204, the system manager 202, and/or any of the devices, systems, sensors, actuators or controllers 206-250.

The build server 302 is configured to communicate with the building device 316 via a network 312. In some embodiments, network 312 communicatively couples the devices, systems, and/or servers of the system 300. In some embodiments, the network 312 is at least one of and/or a combination of a Wi-Fi network, a wired Ethernet network, a Zigbee network, a Bluetooth network, and/or any other wireless network. The network 312 may be a local area network or a wide area network (e.g., the Internet, a building WAN, etc.) and may use a variety of communications protocols (e.g., BACnet, IP, LON, etc.). The network 312 may include routers, modems, and/or network switches. The network 312 may be a combination of wired and wireless networks.

The build server 302 is configured, in some embodiments, to generate and/or store binary files 308. In some embodiments, the build server 302 compiles code describing the binary files 308 for distribution to the building device 316. The binary files 308 may be data describing code for execution by the building device 316. The binary files 308 may each be associated with a particular operation, e.g., a file of code for operating communication on the network 312, a file of code for operating a display screen of the building device 316, a file of code for operating a control algorithm for controlling an environmental condition of a building, etc.

The build server 302 is configured, in some embodiments, to generate a ledger (e.g., as described with reference to FIG. 6) and/or cause each of the binary files 308 to include the ledger. The ledger may be a blockchain ledger including blocks that describe data of the binary files 308, include digital signatures, and/or are linked together via hashes of previous blocks. A blockchain can be a list of records, called blocks, which are linked using cryptography. Each block can include a cryptographic hash of the previous block and block data. Blockchain is are described in greater detail in U.S. patent application Ser. No. 15/592,041 filed May 10, 2017, the entirety of which is incorporated by reference herein.

In some embodiments, each blockchain ledger 310 is meta-data information of the binary file 308 (e.g., is tied to the information of the binary file 308) which stores the blockchain ledger 310 (e.g., one file size, one file location, one hash of the binary file). In some embodiments, the blockchain ledger 310 of each of the binary files 308 is meta-data information of all of the binary files 308 (e.g., all file sizes, all file locations, all hashes of all binary files). In some embodiments, each blockchain ledger 310 is a copy of the entire blockchain (e.g., multiple file sizes, file locations, hashes of binary files, hashes of blocks, hashes of previous blocks, signatures, etc.). In some embodiments, the blockchain ledgers 310 are singly circular linked list such that the metadata of on binary file 308 includes a hash of a next binary file 308 (or binary file block) in the blockchain. In some embodiments, the blockchain ledger 310 is a doubly circular linked list i.e. metadata of one binary file 308 stores a hash of a previous binary file 308 (or previous block) and a next binary file 308 (or next block) in the blockchain. In some embodiments, the blockchain ledger 310 stores a hash of every binary file 308 of the blockchain.

The build server 302 is configured to sign each of the blocks of the blockchain ledger 310 with the private build key 306. The private build key 306 can be a cryptographic key linked to the public build key 304. The private build key 306 can be used by the build server 302 to sign block data of one of the blocks of the blockchain ledger 310 to produce a digital signature. Another device e.g., the building device 316, is configured verify the digital signature with the public build key 304 and the signed data of the block, in some embodiments. In this regard, based on the public build key 304 and the blockchain ledger 310, the building device 316 can verify the authenticity of the blocks of the blockchain ledger 310. The digital signature can be generated and verified via Rives-Shamir-Adleman (RSA)-based signature algorithms, digital signature algorithm (DSA), and/or any other type of cryptographic algorithm (e.g., a Federal Information Processing Standard (FIPS) compliant cryptographic algorithm) for digital signatures.

The build server 302 is configured, in some embodiments, to generate the root ledger 322. The root ledger 322 may be, or may include, a device key 324, a blockchain checksum 326, and/or metadata 328. The blockchain ledgers 310 of the binary files 308 store information about its associated binary file 308 and other peer binary files 308 whereas the root ledger 322 stores the device key 324 (e.g., a device key hash unique for the building device 316), the blockchain checksum 326, and the metadata 328.

The metadata 328 can include various information, for example, the metadata 328 can store the number of the binary files 308, the blockchain checksum 326, and/or any other information. In some embodiments, the metadata 328 may store the type of the blockchain checksum 326, e.g., whether the blockchain checksum 326 is a 16, 23, or 64-bit checksum. The root ledger 322 includes information to verify the entire blockchain. The building device 316 can construct the blockchain and verify the blockchain with the blockchain checksum 326 and/or the metadata 328. The blockchain checksum 326 may be a 16, 32, or 64-bit checksum. The blockchain checksum 326 can be computed from the device key 324 and/or block hashes of all blocks of the blockchain. In this regard, even if all of the binary files 308 are compromised, the blockchain can be verified by computing a blockchain checksum with the blockchain and the device key 324 and comparing the computed checksum against the stored blockchain checksum 326 to verify the binary files 308.

During a software update and/or while provisioning the building device 316, the build server 302 can communicate the binary files 308, the blockchain ledger 310, the root ledger 322, and/or the public build key 304 to the building device 316 via the network 312. In some embodiments, an update device 321 (e.g., a local programmer, a laptop computer, a desktop computer, another building device, etc.) is configured to receive the software update from the build server 302 and program the building device 316. In this regard, the building device 316 can be programmed directly (e.g., via a memory device e.g., a USB drive, an SD card, etc. and/or via a local communication network, etc.) instead of being programmed via the network 312.

The binary files 308 and/or the root ledger 322 can be securely transferred into the root file system of the building device 316 during a provisioning phase of the building device 316, e.g., by the build server 302 and/or by the update device 321. The root ledger 322 and/or the public build key 304 can be added to a trusted execution environment of the building device 316, e.g., a trusted operating system 318.

During a software update, one or many of the binary files 308 in the building device 316 may get upgraded. Some binary files 308 may get deleted and new binary files can be added. In these cases, the metadata of all the binary files 308 can be changed to reflect the newly added blocks in the ledger. Furthermore, the blockchain checksum 326 and/or the metadata 328 of the root ledger 322 of the trusted operating system 318 can be updated to be based on a new hash of a new block of the blockchain (in addition to previously known hashes for previously stored binary files) and/or a new number of binary files 308.

Based on the ledger of the binary files 308 and/or the root ledger 322, the building device 316 is configured to verify that the binary files 308 have not been tampered with, in some embodiments. For example, a tampering system 314 may attempt to tamper with the binary files stored on the building device 316. For example, the tampering system 314 can cause the binary files 308 to include malware or another virus. However, based on the blockchain ledger 310 of the binary files 308 and/or the public build key 304, the building device 316 can detect that one of the binary files 308 has been tampered with.

The building device 316 includes the trusted operating system 318 and a non-trusted operating system 320. The building device is configured to utilize the trusted operating system 318 to securely store the root ledger 322, in some embodiments. The trusted operating system 318 is configured to verify the binary files 308 via the blockchain ledgers 310 of the binary files 308, the root ledger 322, and/or the public build key 304. In some embodiments, the root ledger 322 can never be retrieved by the non-trusted operating system 320. For this reason, in some embodiments, the blockchain validation can be initiated by the non-trusted operating system 320 but validation is performed by the trusted operating system 318. If the root ledger 322 were to be retrieved by the non-trusted operating system 320, the security of the building device 316 could be compromised, for this reason, the trusted operating system 318 can prevent outside sources from accessing the root ledger 322.

Some processors provide a method to execute two different operating systems on a single platform—the Rich Execution Environment (REE), a normal-world operating system (e.g., the non-trusted operating system 320), and a Trusted Execution Environment (TEE), a secure operating system (e.g., the trusted operating system 318). The processor provides hardware mechanisms for isolation between the resources (memory, peripherals, etc.) shared between the TEE and the REE. Hence, the REE runs in a sandbox, and does not have access to many of the peripherals and memory regions which are marked for the TEE. This allows the TEE to implement mechanisms for secure storage and/or execution of Trusted Applications (TA).

In some embodiments, a non-secure operating systems (e.g., the non-trusted operating system 320) boots up with a root file system and start executing signed (from trusted certification authority) binaries present in the disk after signature verification. This verification realizes both integrity and authenticity of the binary file. With blockchain verification, when the code is executed the system checks the signature and flags files as having been tampered with. The system aborts the execution of a tampered binary. At runtime if any binary gets changed after the system gets hacked, there is no runtime monitoring to detect the corrupt/manipulated binaries. However, the blockchain verification techniques described with reference to FIG. 5 and elsewhere herein allow the building device 316 to verify that the binary files 308 have not been tampered with at runtime.

Figure 4:
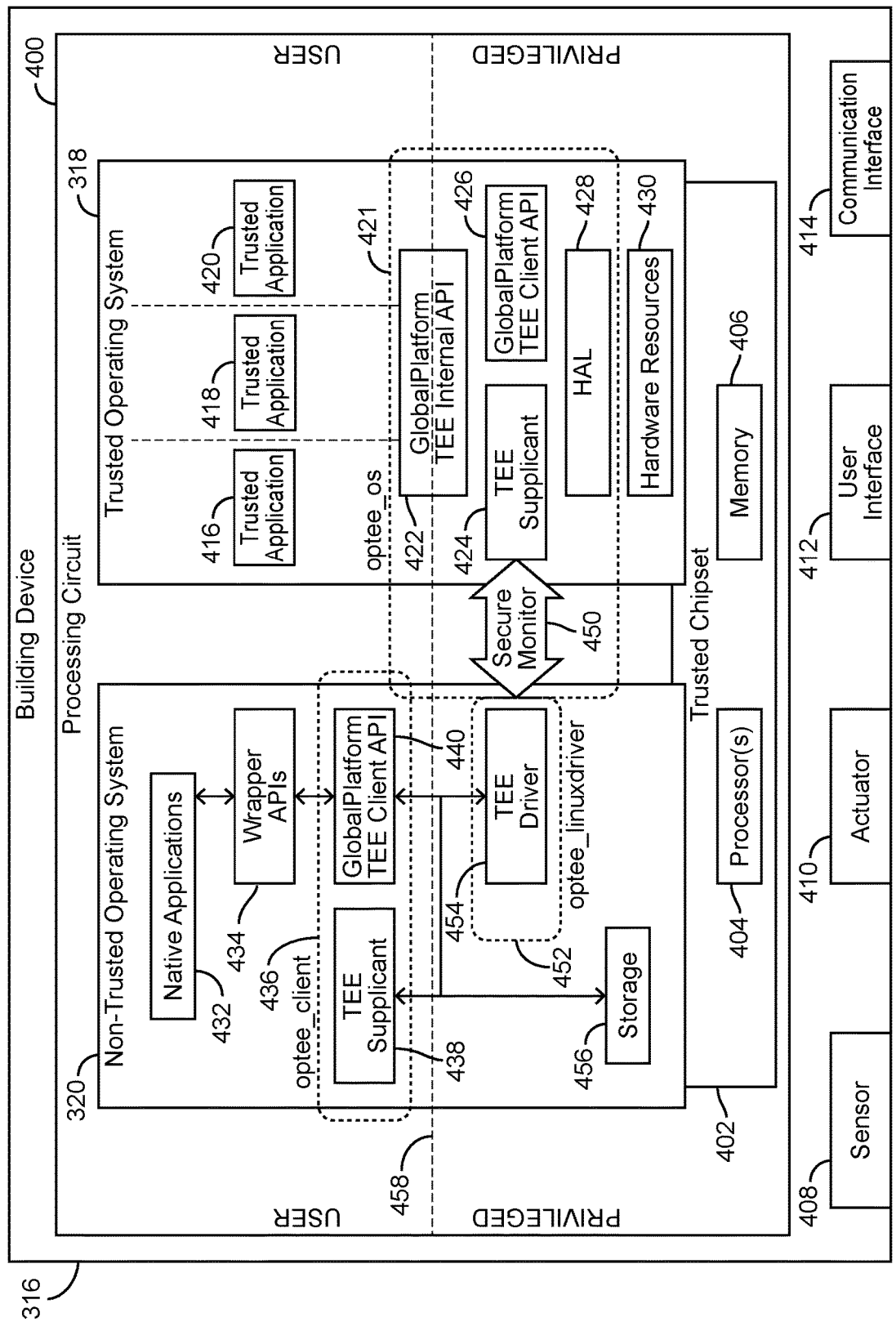
FIG. 4 is a block diagram of the building device illustrated in FIG. 3 including a trusted chipset configured to implement the trusted operating system and the non-trusted operating system, according to an exemplary embodiment.

Referring now to FIG. 4, the building device 316 illustrated in FIG. 3 is shown to include a processing circuit 400 including a trusted chipset 402, according to an exemplary embodiment. The building device 316 further includes a sensor 408, an actuator 410, a user interface 412, and a communication interface 414.

The trusted chipset 402 can be TrustZone hardware, Smart Mobility ARCitecture (SMARC) hardware, Intel SGX, and/or any other similar hardware including isolation techniques. One example of the trusted chipset 402 is TrustZone for Advanced RISC Machine (ARM). The architecture security extensions for ARM, called TrustZone, provide hardware support for partitioning of the systems hardware into secure and non-secure memory and peripherals. It adds-on a processor mode called "monitor mode." The monitor enables switching between secure-mode and non-secure mode. Two different operating systems can be used in each of the modes. The operating system in secure mode is called a Trusted Execution Environment (TEE) (e.g., the trusted operating system 318), and it can access secure and non-secure peripherals/memory. The operating system in non-secure mode is called Rich Execution Environment (REE) (e.g., the non-trusted operating system 320), but it has access to non-secure peripherals only. Thus, the hardware provides an isolation for the two different operating systems (e.g., the non-trusted operating system 320 and the trusted operating system 318), but provides mechanisms for inter-process communication.

The TEE is isolated by hardware (e.g. ARM TrustZone, Intel SGX, etc.) and is tamper proof. Hence, the Rich Execution Environment (REE) cannot tamper with the TEE. Furthermore, the kernel and root file system is authenticated by a chain of trust (e.g., a secure boot). The isolation and kernel a root file system authentication are taken care of by an unforgeable root of trust of the platform, and a secure boot is implemented leveraging hardware provided root of trust. Also, the trusted chipset 402 includes a secure storage, protecting against message replay attacks, in some embodiments.

The trusted chipset 402 is shown to include processor(s) 404 and memory 406. The processor(s) 404 can be general purpose or specific purpose processors, application specific integrated circuits (ASICs), one or more field programmable gate arrays (FPGAs), a group of processing components, or other suitable processing components. The processor(s) 404 may be configured to execute computer code and/or instructions stored in the memory 406 or received from other computer readable media (e.g., CDROM, network storage, a remote server, etc.).

The memory 406 can include one or more devices (e.g., memory units, memory devices, storage devices, etc.) for storing data and/or computer code for completing and/or facilitating the various processes described in the present disclosure. The memory 406 can include random access memory (RAM), read-only memory (ROM), hard drive storage, temporary storage, non-volatile memory, flash memory, optical memory, or any other suitable memory for storing software objects and/or computer instructions. The memory 406 can include database components, object code components, script components, or any other type of information structure for supporting the various activities and information structures described in the present disclosure. The memory 406 can be communicably connected to the processor(s) 404 via the processing circuit 400 and/or the trusted chipset 402 and can include computer code for executing (e.g., by the processor(s) 404) one or more processes described herein.

The sensor 408 can be a temperature sensor, a humidity sensor, an air quality sensor, an occupancy sensor, and/or any other type of sensor configured to measure environment conditions of a building. The building device 316 is further shown to include an actuator 410. The actuator 410 can be any system or device configured to control the environmental conditions of a building. For example, the actuator 410 can be a heating or cooling device and/or system, a motor for controlling a damper, a motor for controlling a fan, etc. Furthermore, the building device 316 includes a user interface 412, the user interface 412 including one or more display and/or input devices (e.g., LCD screens, touch screens, keypads, etc.). Finally, the communication interface 414 includes a communication interface 414 configured to facilitate communication between the building device 316 and the network 312. Examples of sensors, actuators, user interfaces, and communication interfaces are provided in U.S. Ser. No. 15/338,221 filed Oct. 28, 2016, the entirety of which is incorporated by reference herein.

The non-trusted operating system 320 and the trusted operating system 318 are shown, for exemplary purposes, to be Open Portable Trusted Execution Environment (OP-TEE) components although any other operating system environment can be utilized by the trusted chipset 402. The non-trusted operating system 320 and the trusted operating system 318 include components that are accessible by a user or require special access privileges. The components above the line 458 are accessible by a user while the components below the line 458 require special access. A global platform TEE internal application programming interface (API) 422 can be partly privileged and partly user accessible and thus the line 458 is shown to intersect the global platform TEE internal API 422. The non-trusted operating system 320 and the trusted operating system 318 include a secure monitor 450 which may be a function that allows monitoring and/or operation requests to be communicated between the non-trusted operating system 320 and/or the trusted operating system 318.

The non-trusted operating system 320 includes native applications 432, wrapper APIs 434, an optee_client 436, an optee_linux driver 452, and storage 456. The native applications 432 may be applications designed to be executed on the trusted chipset 402, e.g., control applications, binary files, etc. The wrapper APIs 434 may be a wrapper for calling API functions of the global platform TEE client API 440, i.e., the native applications 432 may utilize calling the wrappers of the wrapper APIs 434 instead of calling the API functions of the global platform TEE client API 440 directly. In some embodiments, the wrapper APIs 434 are optional components. In some embodiments, the tee supplicant 438 is a Linux user space supplicant daemon that is configured to facilitate remote services for the TEE OS, e.g., optee_os 421. The TEE driver 454 can be a linux driver of a linux kernel. The storage 456 can be storage for the optee_client 438.

The trusted operating system 318 includes trusted applications 416-420. The trusted applications 416-420 can be software applications that are trusted, i.e., cannot be accessed and manipulated by a hacker or other unauthorized user. The trusted applications 416-420 can be run in the optee_os 421. The optee_os 421 can implement the secure monitor 450, a global platform TEE internal API 422, a TEE core 424, TEE functions 426, a hardware abstraction layer (HAL) 428. The global platform TEE internal API 422 can be standard functions for the trusted applications 416-720 to be written in for running on the optee_os 421. The TEE core 424 can be the secure firmware of the optee_os 421 while the TEE functions 426 can be a library of functions (e.g., cryptographic processes, timer operations, processing operations, etc.) that the optee_os 421 can utilize. The HAL 428 can provide an abstraction between the optee_os 421 and hardware resources 430 of the trusted operating system 318. For example, the HAL 428 can include code or other functions for interacting with the cryptographic circuits, timers, watchdogs, fuses, etc. of the hardware resources 430.

Figure 5:
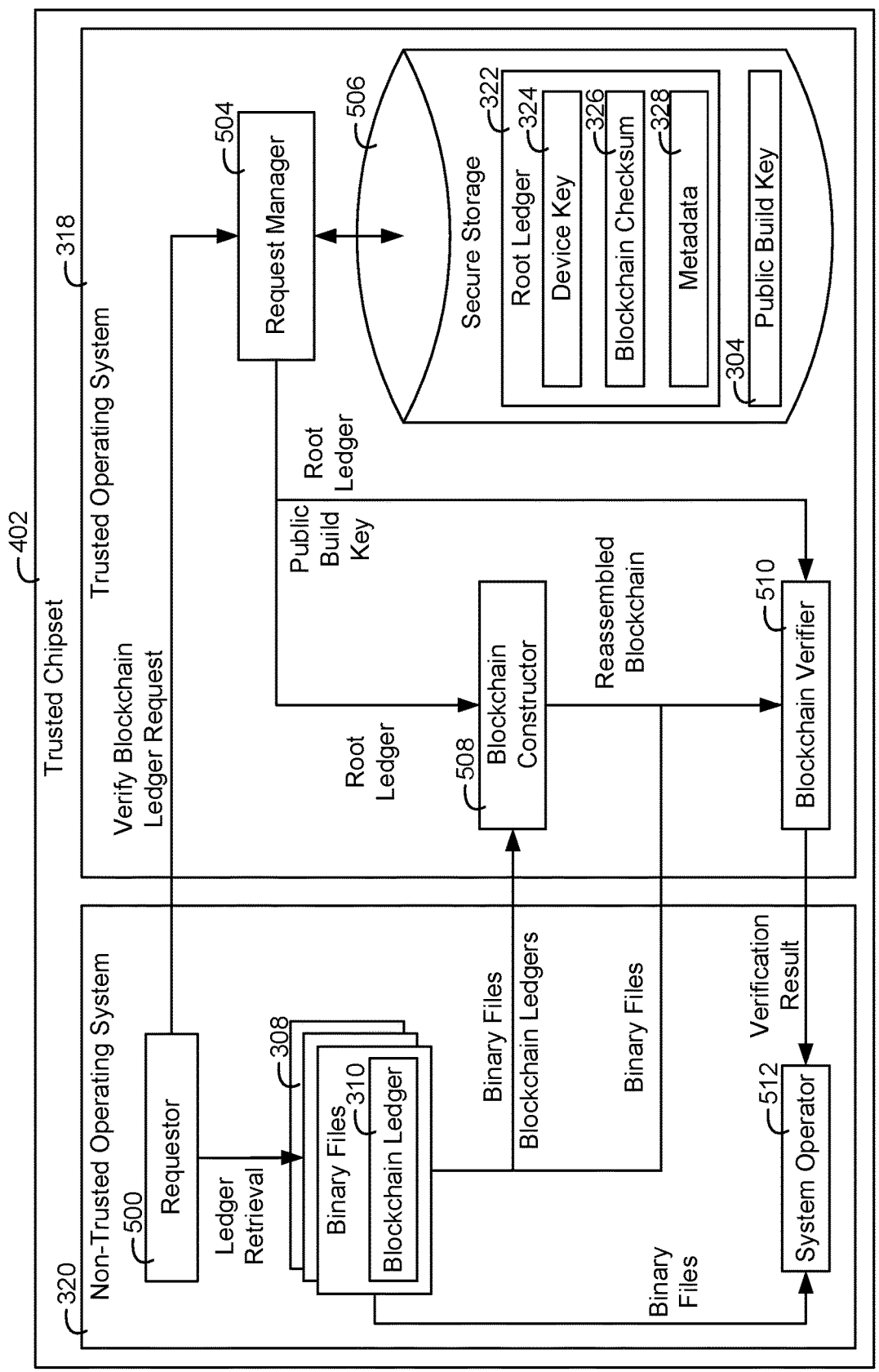
FIG. 5 is a block diagram of the trusted chipset illustrated in FIG. 4 implementing blockchain based verification of binary files of the building device via the trusted operating system and the non-trusted operating system, according to an exemplary embodiment.

Referring now to FIG. 5, the trusted chipset 402, the non-trusted operating system 320, and the trusted operating system 318 are shown in greater detail, according to an exemplary embodiment. The non-trusted operating system 320 is shown to include the binary files 308, each of the binary files including the blockchain ledger 310. In FIG. 5, secrets, e.g., the information stored within secure storage 506, may never leave the trusted operating system 318, i.e., only the trusted operating system 318 may have access to the secrets of the secure storage 506 and/or to the secure storage 506 itself. The secrets may include keys e.g., public and/or private keys (e.g., the public build key 304 and/or the private build key 306) and the root ledger 322 of the blockchain. This partitioning ensures the security of the secrets. Furthermore, the entire verification of the binary files 308 can be performed within the trusted operating system 318 based on information collected and provided to the trusted operating system 318 by the non-trusted operating system 320, lowering the risk of a hacker compromising the building device 316.

The non-trusted operating system 320 includes a requestor 500. The requestor 500 is configured to determine whether to verify the binary files 308. In some embodiments, the requestor 500 includes and/or communicates with a timer. Based on the timer, the requestor 500 is configured to cause the non-trusted operating system 320 to verify the binary files 308 in response to a predefined amount of time elapsing. In some embodiments, the amount of time at which the timer triggers is randomized via a pseudo-random number generating algorithm. Randomization of the time interval can ensure that the verification process and its trigger point is not predictable by hackers. Furthermore, the requestor 500 is configured to determine whether one of the binary files 308 has been requested to execute and/or has been opened for editing. In response to receiving a request to execute and/or edit one or multiple of the binary files 308, the requestor 500 is configured to cause the binary files 308 to be verified before execution.

In response to a determination to verify the binary files 308, the requestor 500 is configured to provide a verify blockchain ledger request to request manager 504 and cause the blockchain ledgers 310 to be provided to the blockchain constructor 508. The trusted operating system 318 includes a request manager 504 which is configured to receive the verify blockchain ledger request from the requestor 500 of the non-trusted operating system 320, in some embodiments. The request manager 504 is configured to retrieve the root ledger 322 from secured storage 506 and provide the root ledger 322 to the blockchain verifier 510, in some embodiments. Furthermore, the request manager 504 is configured to retrieve the public build key 304 by communicating with the secure storage 506. In response to receiving a request to verify the blockchain ledger from the requestor 500, the request manager 504 can retrieve the public build key 304 from the secured storage 506 and provide the public build key 304 to the blockchain verifier 510.

The secured storage 506 can be a data storage device and/or portion of memory that only the trusted operating system 318 can access. More specifically, the non-trusted operating system 320 may not have direct access to the secured storage 506 but rather may rely on the trusted operating system 318 to respond to a request to perform an operation by the trusted operating system 318 with information of the secured storage 506. This partition of memory and/or memory device accessibility can be implemented via the trusted chipset 402. Prohibiting the non-trusted operating system 320 from accessing, editing, and/or viewing the secured storage 506 can prevent a hacker or other individual from editing or replacing the root ledger 322 and/or the public build key 304.

The blockchain constructor 508 is configured to reconstruct a blockchain based on the binary files 308, the blockchain ledger 310, and/or the root ledger 322, in some embodiments. The reassembled blockchain may be the same and/or similar to the blockchain ledgers 310. The blockchain may be a chain of blocks as described in greater detail with reference to FIG. 6. The blockchain constructor 508 can generate a reassembled blockchain based on data of the binary files 308, e.g., size of the binary file 308, hash of the binary files 308, a binary file path of the binary files 308, hash of a previous block (e.g., as computed or as indicated by the blockchain ledgers 310), signature for the block (e.g., as indicated by the blockchain ledgers 310), etc. In some embodiments, the reassembled blockchain is built (e.g., retrieved and unpacked) directly based on one or multiple of the blockchain ledgers 310 and is not constructed (or is not fully constructed) from the data (e.g., size, hash, etc.) of the binary files 308. In some embodiments, the root ledger 322 is one node of the blockchain ledger and is used by the blockchain constructor 508 to complete the blockchain ledger verification. For every verification of the binary files 308, the reassembled blockchain ledger can be constructed by the blockchain constructor 508 with all of the blockchain ledgers 310 of the binary files 308.

In some embodiments, the blockchain verifier 510 verifies the reassembled blockchain with the root ledger 322. For example, the metadata 328 may indicate that there should be five blocks in the blockchain. In this regard, the verifier 510 can verify that the reassembled blockchain includes five blocks. In some embodiments, the blockchain verifier 510 verifies the reassembled blockchain with the blockchain checksum 326. For example, the blockchain verifier 510 can generate a checksum with each block hash of the reassembled blockchain and the device key 324. The result can be compared against the blockchain checksum 326 to verify a match. If the values match, the blockchain verifier 510 can determine that the blockchain is verified.

Based on the reassembled blockchain ledger, the blockchain verifier 510 is configured to verify the reassembled blockchain ledger, in some embodiments. The blockchain verifier 510 is configured to verify the reassembled blockchain ledger with the public build key. In some embodiments, the blockchain verifier 510 can verify the digital signature of each block of the reassembled blockchain ledger with the public build key 304.

Furthermore, the blockchain verifier 510 is configured to calculate and/or identify a size, hash, and/or file path for each of the binary files 308. The blockchain verifier 510 can compare identified and/or calculated size, hash, and/or file path of each of the binary files 308 against the data of corresponding blocks of the reassembled and/or verified blockchain. In some embodiments, each block of the blockchain ledger is associated with one of the binary files 308 and stores a file path, a size, and/or a hash of the binary file 308. Based on the file paths of the binary files 308, the blockchain verifier 510 can identify particular binary file blocks of the reassembled blockchain ledger and compare the data of the blocks with the corresponding data of the binary files 308 identified and/or calculated by the blockchain verifier 510 to verify that the data matches. In response to verifying the reassembled blockchain and/or binary files 308, the blockchain verifier 510 can generate a verification result indicating successful or unsuccessful verification. In some embodiments, the verification result is a Boolean value with one indicating successful verification and zero indication unsuccessful verification. In some embodiments, the verification result is a detailed response including a reason for a verification failure, e.g., the result indicating that the reason for the failure was a hash not matching, a wrong key being used in the blockchain signatures, etc. In such a case, a data structure such as a char, int, or long can be used instead of, or in addition to, the Boolean value. This can provide an indication of the reason that the verification has failed to the non-trusted operating system 320.

The system operator 512 is configured, in some embodiments, to run one or more of the binary files 308. The system operator 512 is configured to cause the binary files 308 to be loaded into memory 406 and/or executed by the processor(s) 404, in some embodiments. In some embodiments, the system operator 512 is configured to only execute the binary files 308 (e.g., the code stored in the binary files 308) in response to receiving a successful verification result from the blockchain verifier 510.

Figure 6:
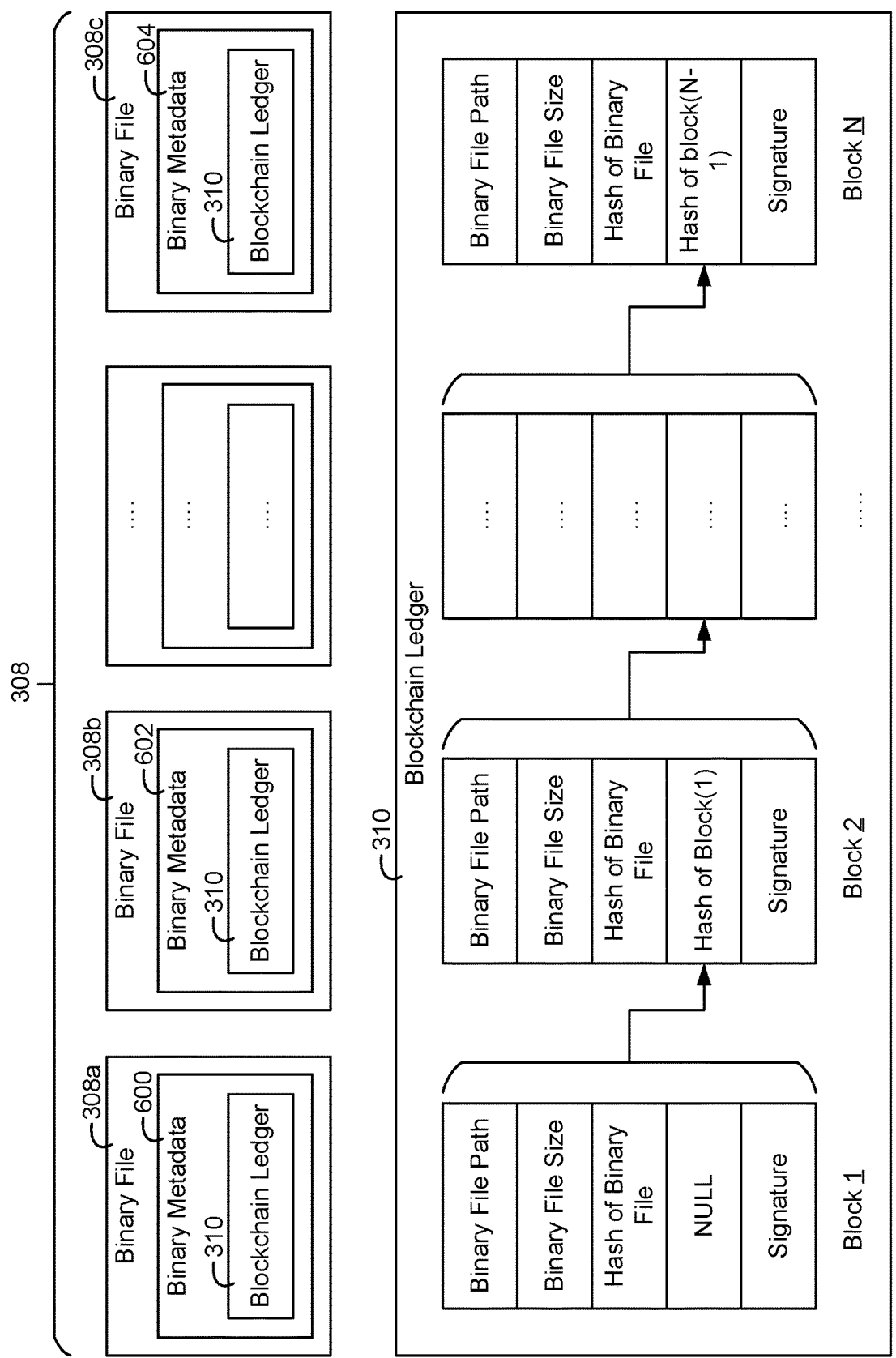
FIG. 6 is a block diagram of the binary files of the building device illustrated in FIG. 5, the binary files including a blockchain ledger, according to an exemplary embodiment.

Referring now to FIG. 6, the binary files 308 and the blockchain ledger 310 is shown in greater detail, according to an exemplary embodiment. The binary files 308 are illustrated individually as binary file 308a, binary file 308b, and binary file 308c. Each of the binary files 308a-c includes the blockchain ledger 310. The build server 302 builds the "n" binary files 308 which are transferred to the building device 316 during factory provisioning or through a software update. The meta-data section can be of variable size to accommodate for the increasing length of the blockchain ledger 310. Each of the binary files 308a-308c includes metadata, binary metadata 600-604 respectively. The binary files 308a-308c can be appended and/or prepended with the metadata which is used to store the blockchain ledger 310. The meta-data can be part of a non-loadable section of the binary files 308a-308c. Since the binary metadata 600-604 each include the blockchain ledger 310, the blockchain ledger 310 is distributed amongst the binary files 308.

The blockchain ledger 310 includes of a chain of blocks, in some embodiments. The data fields of each of the blocks of the blockchain ledger 310 include size and/or hash of one of the binary files within the block to ensures the integrity of the binary file and ensures that hash collision attacks can be prevented, i.e., it is difficult to change the hash of a binary data without changing its size. The hash of the previous block offers a way to connect the blocks of the blockchain ledger 310. All the data fields in the block (e.g., the hash and size of the binary, hash of the previous block) are signed using the private build key 306 of the build server. This digital signature ensures the authenticity of the block and hence the binary files 308.

The binary file 308a corresponds to block 1 of the blockchain ledger 310. The binary file path of the block 1 may correspond to the location in a memory device of the trusted chipset 402 that the binary file 308a is stored. The binary file size of the block 1 may be a numeric value indicating a size in bits, bytes, kilobytes, megabytes, gigabytes, etc. of the binary file 308a. The hash of binary file of the block 1 may represent a hash value of the binary file 308a (e.g., a hash of the entire binary file 308a generated with a hash e.g., Message Digest Algorithm 5 (MD5), Secure Hashing Algorithm (SHA) (e.g., SHA-224, SHA-256, etc.), BLAKE2, and/or any other type of hashing algorithm). The signature of the block 1 may be a value generated with the data of the block 1 and the private build key 306. The block 1 includes a "NULL" entry. Since the block 1 is the first block in the blockchain ledger 310, there is no previous block and therefore the block 1 cannot include a hash of a previous block. Regardless, by including the root ledger 322, which is in the secure storage 506, the blockchain will be complete. With the root ledger 322, even in a worst case scenario when all the binary files 308 which form the blockchain ledgers 310 are compromised and hence the blockchain is also compromised, the blockchain verification will fail because the root ledger is still sane as it cannot be accessed by a hacker.

Figure 7A:
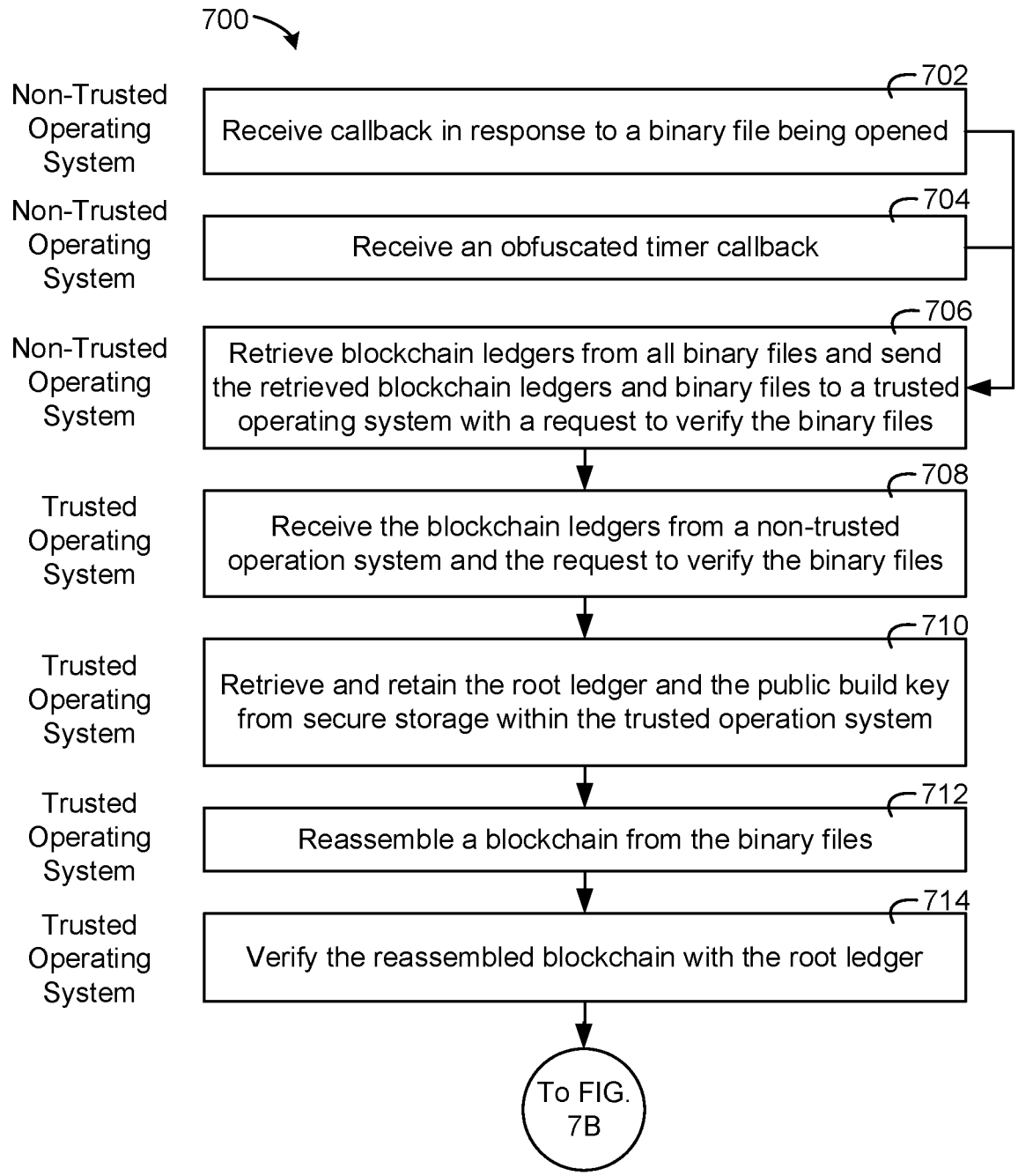
FIGS. 7A-7B is a flow diagram of a process for implementing blockchain based verification of the binary files that can be performed by the building device illustrated in FIG. 4 via the trusted operating system and the non-trusted operating system, according to an exemplary embodiment.
Figure 7B:
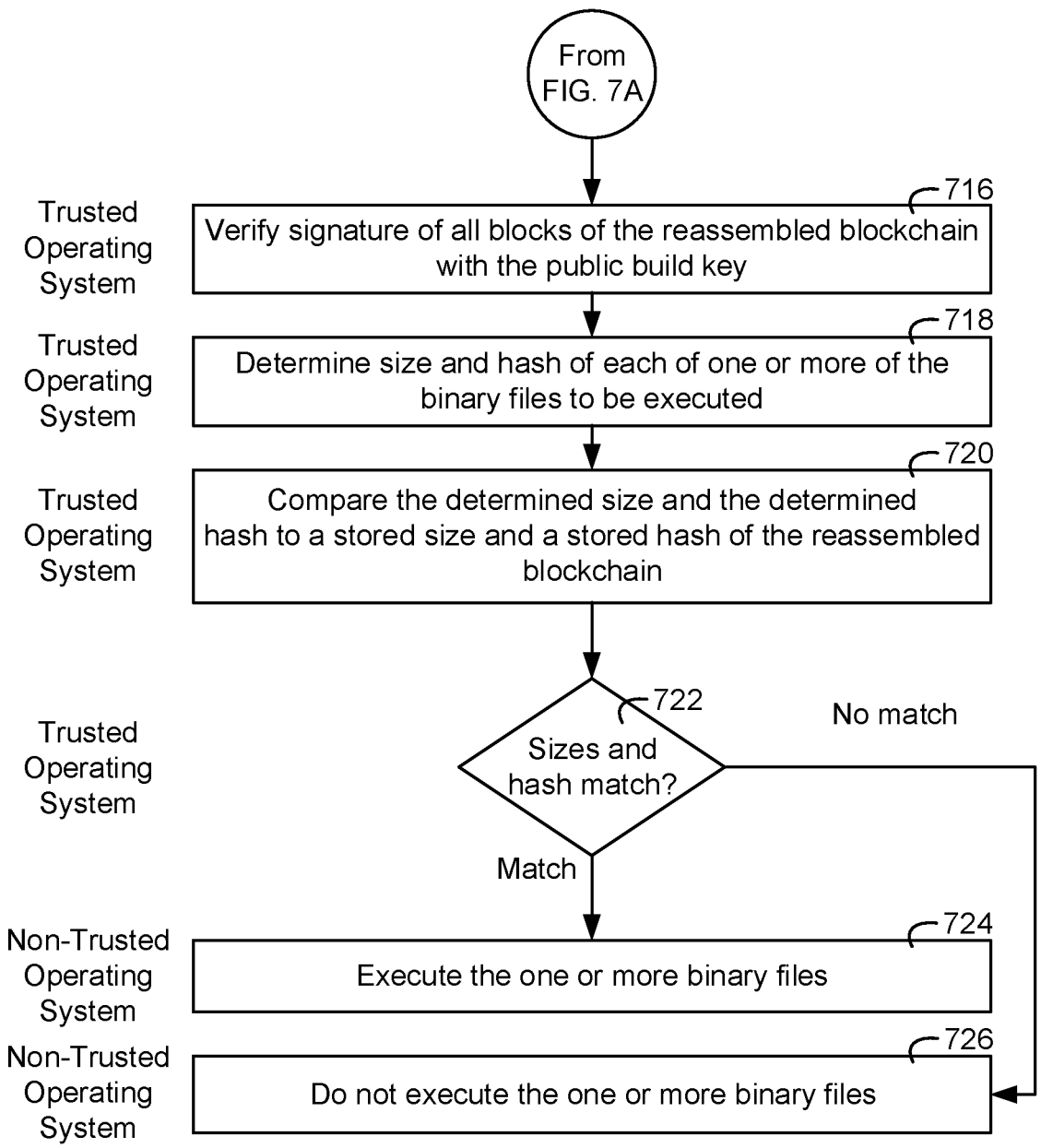

Block 2 and block N represent blocks for the binary files 308b and 308c respectively. The block 2 includes similar entries as the block 1 but also includes a "Hash of Block(1)" entry. This entry may refer to a hash of the block 1 in its entirety. In some embodiments, the block 1 also includes a nonce value which can be adjusted and hashed with the rest of the data of the block 1 until the hash of the block 1 is less than a predefined amount. In some embodiments, only if the hash is less than the predefined amount is the hash valid. A chain of such hashes can be generated for the blockchain ledger 310 and is generalized in block N as, Block Hash of Block $N$=Hash of block$(N-1)$ Referring now to FIGS. 7A-7B, a process 700 is shown of verifying one or multiple binary files via blockchain, according to an exemplary embodiment. In some embodiments, the building device 316 is configured to perform some and/or all of the steps of the process 700. Furthermore, any computing device as described herein is configured to perform the process 700, in some embodiments. Any computing device, not only building devices, can be configured to perform the process 700 of FIGS. 7A-7B.

The process 700 provides a runtime integrity check of binary files making use of the blockchain ledgers 310 distributed in the binary files 308, as well as the root ledger 322 stored within the secured storage 506 of the trusted operating system 318. The process 700 provides systems with a high degree of Byzantine Fault Tolerance. For instance, in a system with eight binary files, there may be nine distributed copies of the blockchain ledger (one in each of the eight binary files plus a secured copy in the secured storage 506). The system can be compromised only if more than three of the blocks can be forged.

The steps of the process 700 are shown to occur within the non-trusted operating system 320 and the trusted operating system 318. More specifically, the steps 708-722 are performed by the trusted operating system 318 while the steps 702-706, 724, and 726 are performed by the non-trusted operating system 320, in some embodiments. In some embodiments, the steps 702-726 of the process 700 are performed by a single operating system. For example, in some embodiments, the steps 702-726 are all performed by the trusted operating system 318.

In step 702, the non-trusted operating system 320 can receive a callback in response to a binary file 308 being opened and/or being requested to be opened. In some embodiments, the callback is generated in response to the binary file 308 being loaded and/or being opened for editing. The callback may indicate that the building device 316 is attempting to, or is requesting to, execute the binary file 308. In response to a request to operate one of the binary files 308, the non-trusted operating system 320 can initiate a verification of the binary files 308 and/or the binary files 308 to be executed by the non-trusted operating system 320. Similarly, in step 704, an obfuscated timer callback can occur causing the non-trusted operating system 320 to initiate the verification of the binary files 308. In some embodiments, in response to a predefined amount of time elapsing, the callback can be generated causing the initiation of the verification. In some embodiments, the predefined amount of time is short, e.g., one or two minutes, so that the binary files 308 are verified at a frequent period to quickly detect tampering of the binary files 308. In some embodiments the amount of time changes to pseudo-randomly selected time amounts.

In some embodiments, immediately after initiating the verification, the non-trusted operating system 320 can obtain and verify that the blockchain ledgers 310 of the binary files 308 have not been tampered with. In some embodiments, the trusted operating system 318 can re-compute the hash values of the blockchain ledgers 310 to verify that the blockchain ledger 310 is valid.

In step 706, the non-trusted operating system 320 can retrieve the blockchain ledgers 310 from all the binary files 308 and send the blockchain ledgers 310 to the trusted operating system 318. Furthermore, the non-trusted operating system 320 can send the binary files 308 to the trusted operating system 318. In some embodiments, the non-trusted operating system 320 sends a request to perform a verification of the binary files 308 to the trusted operating system 318. In step 708, the trusted operating system 318 can receive the blockchain ledgers 310, the binary files 308, and/or the request to perform the verification from the non-trusted operating system 320. In response to receiving the verification, the trusted operating system 318 can perform the blockchain verification of steps 710-722.

In step 710, the trusted operating system 318 can retrieve the public build key 304 and the root ledger 322 from the secured storage 506 and retain the public build key 304 and the root ledger 322 within the trusted operating system 318.

In step 712, the trusted operating system 318 can reassemble the blockchain. In some embodiments, reassembling the blockchain includes computing hashes for blocks of the blockchain, i.e., computing hashes of blocks of one or all of the ledgers 310 and checking the validity of each hash. In some embodiments, the trusted operating system 318 reassembles blocks of the blockchain ledger with the "hash of previous block" field in each of the blocks. In some embodiments, the trusted operating system 318, specifically the blockchain constructor 508, reassembles the blockchain ledger based on the binary files 308, the blockchain ledgers 310, and/or the root ledger 322. In some embodiments, the trusted operating system 318 reassembles a blockchain ledger for each of the blockchain ledgers 310 of each of the binary files 308 for verification with the public build key 304 of each of the reassembled blockchain ledgers and/or the hash and size based verifications of the steps 720-722.

In step 714, the trusted operating system 318 can verify the reassembled blockchain ledger with the root ledger 322. In some embodiments, the trusted operating system 318 can retrieve each block hash of the reassembled blockchain and generate a checksum with the block hashes (e.g., all block hashes) and the device key 324. The trusted operating system 318 can compare the generated checksum to the blockchain checksum 326 stored in the secure storage 506 by the root ledger 322. Providing the stored and generated checksums match, the trusted operating system 318 can proceed to steps 716-724 or alternatively to step 726 if the checksums do not match.

In step 716, the trusted operating system 318 verifies a signature of all of the blocks of the reassembled blockchain of the step 712 based on the public build key 304 retrieved in the steps 710. In some embodiments, the signature of each of the blocks is generated by the build server 302 based on data of each block and the private build key 306. In some embodiments, the operation to generate the signature is represented as, Signature=$f$(Private Build Key,Block Data)

Since the private build key 306 and the public build key 304 are related, the trusted operating system 318 can verify the signature of each block with data of the block and the public build key 304. In some embodiments, if the signature of each block is verified, the process 700 continues to the step 720. However, if the signature of one or multiple (e.g., a predefined number) of the blocks cannot be verified, the process proceeds to the step 726. In some embodiments, the operation to verify the signature is represented as, Signature Validity=$f$(Public Build Key,Block Data, Signature)

In step 718, the non-trusted operating system 320 can determine a size and/or hash of one or multiple of the binary files 308 to be executed. In some embodiments, the non-trusted operating system 320 stores a record of requests to execute particular binary files 308. In some embodiments, the non-trusted operating system 320 determines the size and/or hash of all of the binary files 308 to be executed.

In step 720, the trusted operating system 318 compares the determined size and hash of the step 718 with a stored size and/or hash stored in a block of the reassembled blockchain ledger of the step 712 (or against multiple reassembled blockchain ledgers). In some embodiments, the trusted operating system 318 identifies the stored hash and/or size for comparison based on a path of the binary file to be executed, e.g., the path of the binary files 308 to be executed may be included in its own block along with the size and/or hash of the binary files 308.

In step 722, the non-trusted operating system 320 determines to proceed to step 724 or step 726 based on whether the comparison of the step 720 results in a match. If the comparison results in a match, the process 700 proceeds to the step 726. If the comparison does not result in a match, the process 700 proceeds to the step 724. In the step 724, the non-trusted operating system 320 executes the one or more binary files 308. In some embodiments, the non-trusted operating system 320 executes the binary files 308 that have been requested to be executed. In some embodiments, executing the binary files 308 includes operating other equipment to control environmental conditions of a building, operating a display screen, a communication interface, etc.

In step 726, the non-trusted operating system 320 can determine to not execute the one or more binary files 308. In some embodiments, if tampering has been detected, the non-trusted operating system 320 performs actions can be taken based on preset policies stored by the non-trusted operating system 320. In some embodiments, the non-trusted operating system 320 operates in a safe mode, reduces the operations of the building device 316, etc. In some embodiments, the non-trusted operating system 320 stops the building device 316 from communicating with other systems to avoid spreading viruses which may have been injected into the binary files 308.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A building device of a building, the building device comprising or being in communication with a processing circuit configured to:
   store one or more files, each of the one or more files comprising instructions and a ledger, the ledger comprising information describing at least one of the one or more files;
   verify the one or more files by:
      retrieving a root ledger from storage of the processing circuit, wherein the root ledger comprises second information based on one or more characteristics of a blockchain;
      reassembling the blockchain based on the ledger of each of the one or more files;
      verifying the blockchain with the root ledger; and
      verifying the one or more files with the blockchain verified with the root ledger; and
   execute the instructions of the one or more files in response to a determination that the one or more files are verified.

2. The building device of claim 1, wherein verifying the one or more files with the blockchain verified with the root ledger comprises:
   determining at least one of a size or a hash of each of the one or more files; and
   comparing at least one of the size or the hash of each of the one or more files to a stored size and a stored hash stored within the blockchain verified with the root ledger to verify the one or more files.

3. The building device of claim 1, wherein the processing circuit is configured to verify the one or more files by retrieving a build key from the storage of the processing circuit and verifying the blockchain with the build key.

4. The building device of claim 1, wherein the second information based on the one or more characteristics of the blockchain comprise a stored checksum, wherein the stored checksum is based on a block hash of each of a plurality of blocks of the blockchain and a device key, wherein the root ledger further comprises the device key;
   wherein verifying the blockchain with the root ledger comprises:
      generating a checksum based the block hash of each of the plurality of blocks of the blockchain and the device key; and
      comparing the checksum to the stored checksum.

5. The building device of claim 1, wherein the one or more files are one or more binary files comprising binary data representing the instructions and metadata, wherein the metadata comprises the ledger.

6. The building device of claim 1, wherein the processing circuit is configured to:
   receive a request to execute the instructions of at least one of the one or more files; and
   verify the one or more files in response to a reception of the request to execute the instructions of the one or more files.

7. The building device of claim 1, wherein the processing circuit is configured to:
   determine, via a timer, that an amount of time has elapsed; and
   verify the one or more files in response to a second determination that the amount of time has elapsed.

8. The building device of claim 7, wherein the processing circuit is configured to determine the amount of time by pseudo-randomly generating a value for the amount of time.

9. The building device of claim 1, wherein the processing circuit is a trusted chipset configured to implement a trusted operating system and a non-trusted operating system.

10. The building device of claim 9, wherein the storage is secured storage of the trusted operating system and is only accessible by the trusted operating system.

11. The building device of claim 9, wherein the trusted chipset is configured to verify, via the trusted operating system, the blockchain with a build key and the root ledger;

wherein the trusted chipset is configured to execute, via the non-trusted operating system, the instructions of the one or more files in response to the determination that the one or more files are verified.

12. The building device of claim 1, wherein the blockchain comprising a plurality of blocks, each of the plurality of blocks comprising a signature, wherein the processing circuit is configured to verify the one or more files with a build key by verifying the signature of each of the plurality of blocks of the blockchain with the build key.

13. The building device of claim 12, wherein each of the plurality of blocks corresponds to one of the one or more files, wherein the one or more files are a plurality of files;
    wherein a first block of the plurality of blocks corresponds to a first file and a second block of the plurality of blocks corresponds to a second file.

14. The building device of claim 13, wherein the second block comprises:
    particular information of the second file;
    a hash of the first block; and
    a particular signature.

15. The building device of claim 14, wherein the particular information of the second file comprises at least one of a path of the second file indicating a location where the second file is stored, a size of the second file, or a second hash of the second file.

16. The building device of claim 14, wherein the particular signature is based on a private build key and the particular information of the second file, wherein the build key is a public build key linked with the private build key;
    wherein the processing circuit is configured to verify the blockchain with the public build key by determining that the particular signature is authentic based on the particular information of the second file, the signature, and the public build key.

17. A method comprising:
    storing, by a processing circuit associated with a building device, one or more files in first storage of the processing circuit, each of the one or more files comprising instructions and a ledger, the ledger comprising information describing at least one of the one or more files;
    verifying, by the processing circuit, the one or more files by:
        retrieving a root ledger from second storage of the processing circuit, wherein the root ledger comprises second information based on one or more characteristics of a blockchain;
        reassembling the blockchain based on the ledger of each of the one or more files;
        verifying the blockchain with the root ledger; and
        verifying the one or more files with the blockchain verified with the root ledger; and
    executing, by the processing circuit, the instructions of the one or more files in response to a determination that the one or more files are verified.

18. The method of claim 17, wherein the processing circuit is a trusted chipset configured to implement a trusted operating system and a non-trusted operating system;
    wherein the second storage is secured storage of the trusted operating system and is only accessible by the trusted operating system.

19. The method of claim 18, wherein verifying the blockchain with the root ledger comprises verifying, via the trusted operating system, the blockchain with a build key and the root ledger;
    wherein executing, by the processing circuit, the instructions comprises executing the one or more files via the non-trusted operating system.

20. An edge device comprising a processing circuit configured to:
    store one or more files, each of the one or more files comprising instructions and a ledger, the ledger comprising information describing at least one of the one or more files;
    verify the one or more files by:
        retrieving a root ledger from storage of the processing circuit, wherein the root ledger comprises second information based on one or more characteristics of a blockchain;
        reassembling the blockchain based on the ledger of at least one of the one or more files;
        verifying the blockchain with the root ledger; and
        verifying the one or more files with the blockchain verified with the root ledger; and
    execute the instructions of the one or more files in response to a determination that the one or more files are verified.

* * * * *